(12) United States Patent
Goel

(10) Patent No.: US 7,362,770 B2
(45) Date of Patent: Apr. 22, 2008

(54) METHOD AND APPARATUS FOR USING AND COMBINING SUB-FRAME PROCESSING AND ADAPTIVE JITTER-BUFFERS FOR IMPROVED VOICE QUALITY IN VOICE-OVER-PACKET NETWORKS

(75) Inventor: Nagendra Goel, McLean, VA (US)

(73) Assignee: LSI Logic Corporation, Milpitas, CA (US)

( * ) Notice: Subject to any disclaimer, the term of this patent is extended or adjusted under 35 U.S.C. 154(b) by 1005 days.

(21) Appl. No.: 10/236,115

(22) Filed: Sep. 6, 2002

(65) Prior Publication Data
US 2004/0047369 A1 Mar. 11, 2004

(51) Int. Cl.
*H04L 12/28* (2006.01)
(52) U.S. Cl. ............ 370/412; 370/428; 370/352; 370/516
(58) Field of Classification Search ............ 370/412, 370/428, 429, 352–356
See application file for complete search history.

(56) References Cited

U.S. PATENT DOCUMENTS

| | | | | |
|---|---|---|---|---|
| 6,735,195 B1 * | 5/2004 | Mehta | | 370/352 |
| 6,859,460 B1 * | 2/2005 | Chen | | 370/412 |
| 6,901,270 B1 * | 5/2005 | Beach | | 455/563 |
| 7,117,156 B1 * | 10/2006 | Kapilow | | 704/267 |
| 2002/0080779 A1 * | 6/2002 | LeBlanc | | 370/352 |
| 2003/0043784 A1 * | 3/2003 | Selin | | 370/352 |

\* cited by examiner

*Primary Examiner*—Ricky Q. Ngo
*Assistant Examiner*—Kibrom T Hailu
(74) *Attorney, Agent, or Firm*—Trexler Bushnell Giangiorgi & Blackstone Ltd.

(57) ABSTRACT

A method and apparatus for using and combining sub-frame processing and adaptive jitter-buffers for improved voice quality in voice-over-packet networks. Data is placed in a jitter buffer, where the data has a frame-length consisting of a plurality of samples. Some of the samples are placed in the DMA buffer, and some of the samples are placed in the back-up buffer. Samples are read out of the DMA buffer, and samples are moved from the back-up buffer to the DMA buffer.

18 Claims, 3 Drawing Sheets

METHOD AND APPARATUS FOR USING AND COMBINING SUB-FRAME PROCESSING AND ADAPTIVE JITTER-BUFFERS FOR IMPROVED VOICE QUALITY IN VOICE-OVER-PACKET NETWORKS

BACKGROUND

The present invention generally relates to voice communication over packet networks, and more specifically relates to a method and apparatus for improving voice quality in voice-over-packet networks.

A typical architecture of a voice-over packet system (focusing only on the voice communication part) is illustrated in FIG. 1. The voice encoders/decoders 10 and 12 shown in FIG. 1 are the most commonly used as per present ITU/T recommendations. However, such details may change over time, and are given in FIG. 1 for illustration purposes only. Many sources are readily available which provide a detailed description of the various components of a voice-over packet system.

Due to the inherent nature of packet-based data communication networks, although the voice-over-packet communication device sends packets to the other end at equal time intervals, when the packets are received from the network, they do not arrive at equal time intervals. The difference in time of arrival of packets is called "jitter." Sometimes, depending on the network protocol used, and the network conditions, the packets may even arrive in a sequence that is different from the sequence in which they were sent. As shown in FIG. 1, a voice-over packet system typically includes a network jitter compensator or jitter buffer 14. The network jitter compensator 14 temporarily holds the packets received from the network, and, if necessary, makes sure that they are in sequence.

However, sometimes a packet arrives so late, there are no packets left in the jitter buffer that could be played out. In that case, the decoder has to perform the task of "filling-in" by extending the current speech signal further. In a typical system, such an operation of "filling-in" is performed on a frame-by-frame (where the frame size is the length of speech that is encapsulated in a packet) basis. Typically, when the system is implemented on a DSP, there is a DMA and an associated memory buffer that is used to transmit the speech samples to the PCM TELCO interface. Every time the buffer starts getting empty, a packet is decoded, and the corresponding speech is added to the buffer. Once a piece of data is placed in that buffer, it cannot be modified. Therefore, when a packet arrives too late, one full frame is lost. Even if the packet arrives right after the first speech sample for the corresponding packet is being played out at the PCM TELCO interface, the entire packet is discarded.

When CELP coders are used in such system, another problem is presented. CELP coders (and sometimes even waveform coders) typically have a "coder state" associated with them. When the communication channel is loss-less, the encoder state and the decoder state are in synchronization. However, when a packet is lost, and the decoder has to "fill-in" for the lost packet, the state of the decoder changes, and the encoder and the decoder lose synchronization. Thereafter, it may take several frames for the two to regain synchronization, thus resulting in a higher degradation in voice quality. The present invention is directed at solving both of these problems.

OBJECTS AND SUMMARY

A general object of an embodiment of the present invention is to provide a method and apparatus for improving voice quality in voice-over-packet networks.

Another object of an embodiment of the present invention is to provide a method and apparatus for use in voice-over-packet networks which provides that a full frame is not lost when a packet arrives too late.

Still another object of an embodiment of the present invention is to provide a method and apparatus for use in voice-over-packet networks which provides that an encoder and the decoder do not lose synchronization.

Briefly, and in accordance with at least one of the foregoing objects, an embodiment of the present invention provides a method and apparatus for using and combining sub-frame processing and adaptive jitter-buffers for improved voice quality in voice-over-packet networks. Incoming network packets are placed in a jitter buffer, where the packets correspond to a frame-length consisting of a plurality of samples. On the playout side, some of the decoded samples are placed in the DMA buffer, and the remaining decoded samples are placed in the back-up buffer. Samples are read out of the DMA buffer, and samples are moved from the back-up buffer to the DMA buffer. The packet data is decoded before samples are placed in the DMA buffer and back-up buffer. For example, the frame-size of the packet data may be 80 samples, where 20 samples are placed in the DMA buffer and 60 samples are placed in the back-up buffer. When the DMA runs out of samples, it is checked to determine if there are any samples in the back-up buffer. To ensure a continuous flow, a back-up DMA buffer may be used. If there are no samples in the back-up buffer, data is taken from the jitter buffer, decoded, and used to fill the DMA buffer and back-up buffer. If there is no data/packets in the jitter buffer, a copy of the decoder state is made, and speech samples are generated for missing packets by running the decoder in packet-loss mode. When the corresponding packet arrives late, the copy of the decoder state is used and the packet is decoded. If a jitter buffer is being used which waits for the right opportunity to change the system delay, and is indeed looking for an opportunity to increase the system delay, then the system delay is increased. Otherwise, the portion of decoded packet that has already been played out is discarded. Next, the remainder samples in the Playout buffer are merged with the recently decoded output using overlap-and-add. The resulting state of the decoder is used for subsequent frames which arrive.

The description herein assumes that the system is implemented on a DSP processor that uses a DMA device for data transfer to the TELCO interface. However, it is entirely possible to have the same system implemented on an ASIC, or DSP without the DMA or some other future technology.

BRIEF DESCRIPTION OF THE DRAWINGS

The organization and manner of the structure and operation of the invention, together with further objects and advantages thereof, may best be understood by reference to the following description, taken in connection with the accompanying drawings, wherein.

DESCRIPTION

Figure 1:
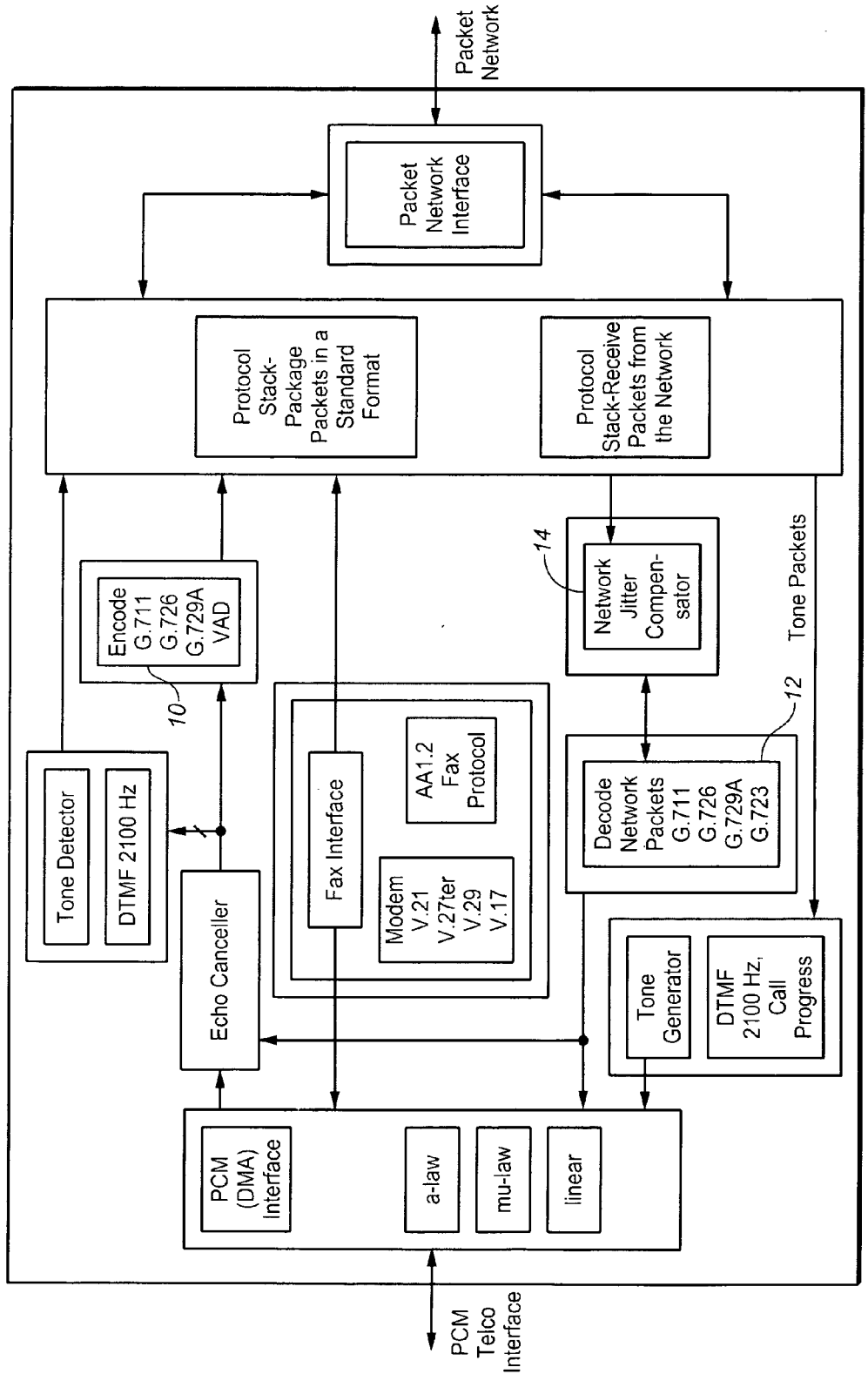
FIG. 1 is a block diagram which illustrates a typical architecture of a voice-over-packet system, focusing on the voice communication part of the system.

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

Figure 2:
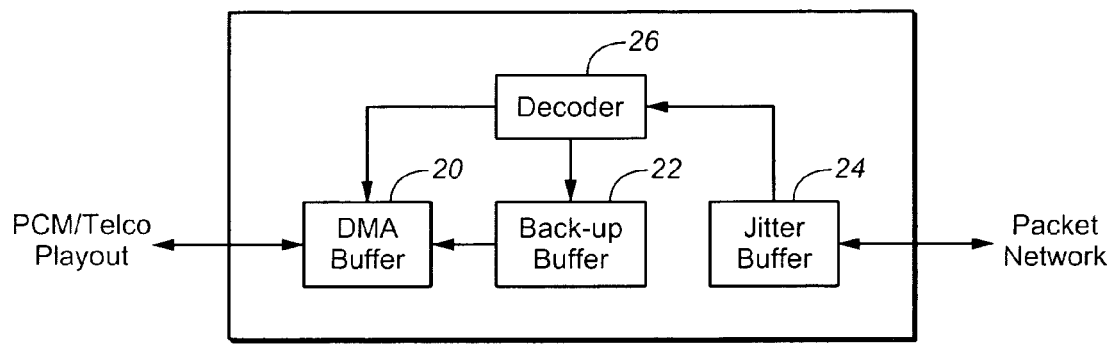
FIG. 2 is a block diagram which illustrates components of a voice-over-packet system where the present invention is being employed.

FIG. 2 illustrates some components of a voice-over-packet system where an embodiment of the present invention is being employed. Specifically, an embodiment of the present invention provides that a DMA buffer 20 is filled only with a fraction of the frame-length of the data. For example, assuming that a system uses a frame-size of 80 samples (10 milliseconds of speech), an embodiment of the present invention may provide, for example, that the 80 samples are divided into four pieces containing 20 samples each, and also that the DMA buffer size is set to 20 samples. When the first frame is decoded, 80 samples are received. While 20 of these samples are placed in the DMA buffer 20, the remaining 60 samples are placed in a back-up buffer 22. On certain architectures, there will be two DMA buffers, so that one is prepared for playout while the other is already being played out. In that case, ten samples may be assigned to each buffer while keeping 60 in the back-up buffer. Whenever the DMA buffer 20 starts getting empty, the system first checks to determine if there are any samples in the back-up buffer 22. If there are any samples contained in the back-up buffer 22, they are moved to the DMA buffer 20. Otherwise, a packet is received from the jitter buffer 24 (shown as 14 in FIG. 1), decoded (via decoder 26 (shown as 12 in FIG. 1)), and resulting samples are used to fill up the DMA buffer and the back-up buffer. If there are no packets in the jitter buffer, due to network delays, the appropriate packet-loss concealment is used This step may be referred to as the loss concealment step.

Normally, if a packet arrives late from the network, the packet is typically discarded. However, the present invention provides that the packet is immediately decoded. After the decoding is complete and the speech samples are available, the back-up buffer 22 is checked to determine if there are any samples therein. If the back-up buffer 22 has any samples, they are merged with the decoded samples as follows, per the following steps:

1. Make a copy of the decoder state ("copy A"), before generating the filler speech samples mentioned in the loss concealment step above. Then, generate the speech samples for the lost (or late) packet by running the decoder in packet-loss mode.

2. When the packet arrives late, discard the current state of the decoder and use the backup copy A of the decoder state to decode the packet. The resulting state of the decoder is state B.

3. Assuming the frame size is N and that there are Nb samples left in the buffer, this means that the first (N-Nb) samples of the current frame have already been placed in the DMA buffer and will be played out. Therefore, a discontinuity has already occurred. If a jitter buffer design is being used where the jitter buffer waits for the appropriate moment to change the amount of delay in the system, and the jitter buffer is indeed waiting for an appropriate moment to INCREASE the delay, then this would be an appropriate moment to increase the delay in the system through the following steps:

a) Increase the system playout delay by (N-Nb) samples.

b) Merge the decoded output with the playout buffer using overlap-and-add.

If the jitter buffer does not support this feature, or is not intendeing to increase the system delay, then the following steps would be followed:

a) Discard the first (N-Nb) samples of the decoded output.

b) Merge the remaining samples with the playout buffer using overlap-and-add.

Figure 3:
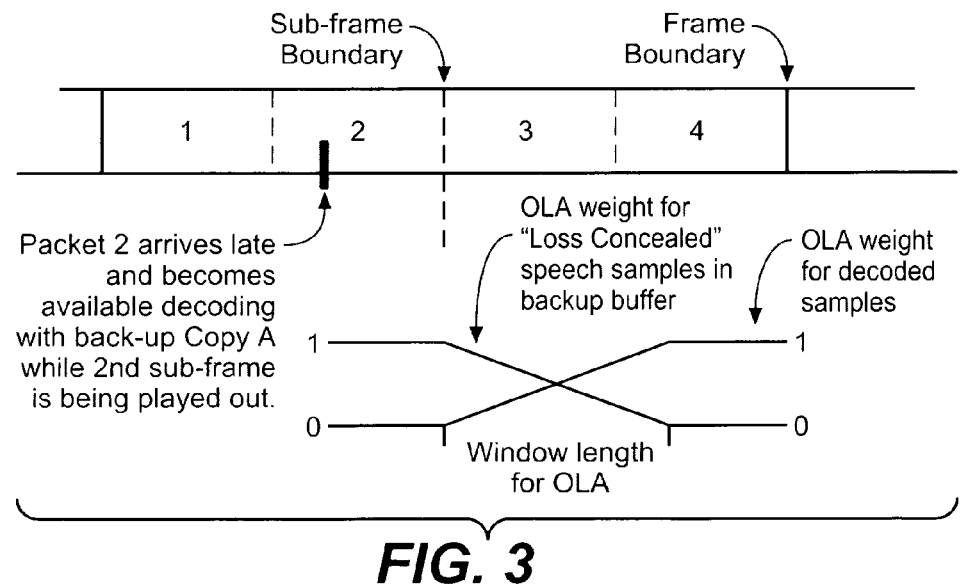
FIG. 3 is a diagram which illustrates how an overlap-and-add algorithm (OLA) can be used to merge backup buffer samples.

4. The samples in the decoded buffer are merged with the samples in the back-up buffer, using the overlap-and-add (OLA) method. Alternatively, if more computational resources are available, the PSOLA algorithm can be used. This consists of multiplying the samples in the back-up buffer with values that decrease from 1 to 0 over time, and the decoded buffer with values that increase from 0 to 1 over time, and adding the result of the two. An example using a triangular OLA window is shown in FIG. 3. The parameters of OLA, such as window length can be chosen dynamically to provide a most pleasing voice quality. Usually a window length of 4 ms should suffice for short jitters.

5. Continue using the resulting state B of the decoder for the next frames that are to arrive.

Figure 4:
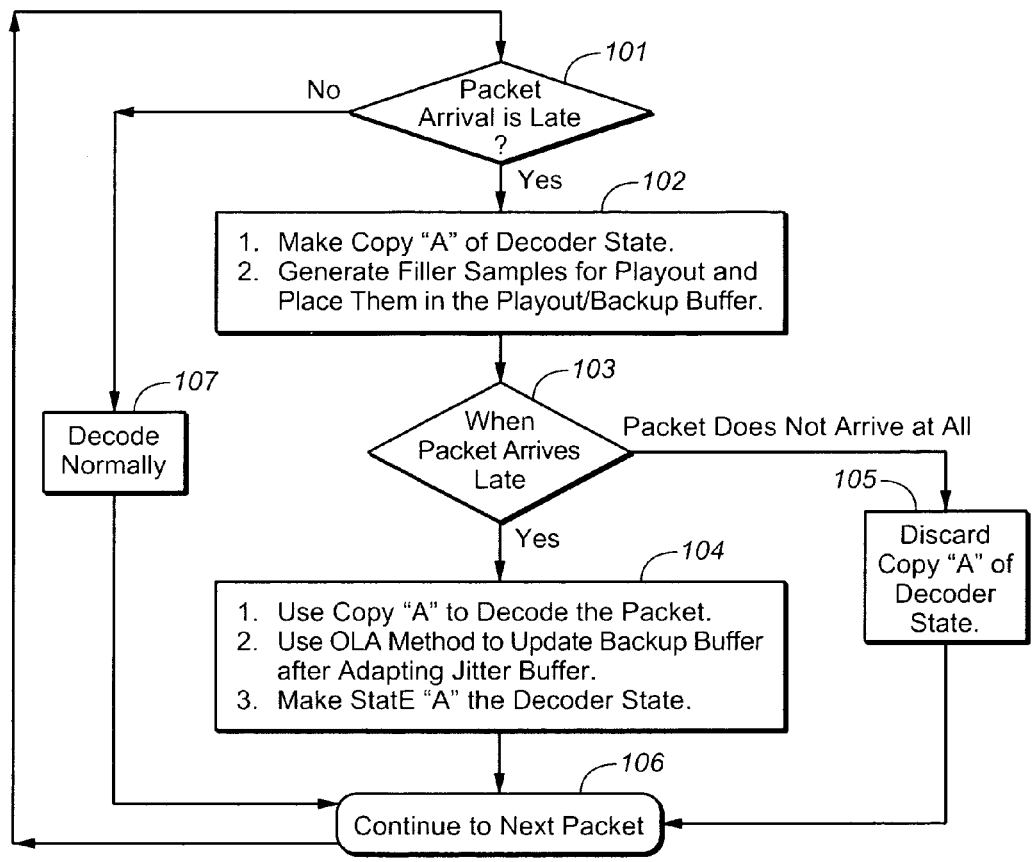
FIG. 4 is a flow chart which illustrates sub-frame processing in accordance with an embodiment of the present invention.

These steps are depicted schematically in the form of a flowchart in FIG. 4.

Figure 5:
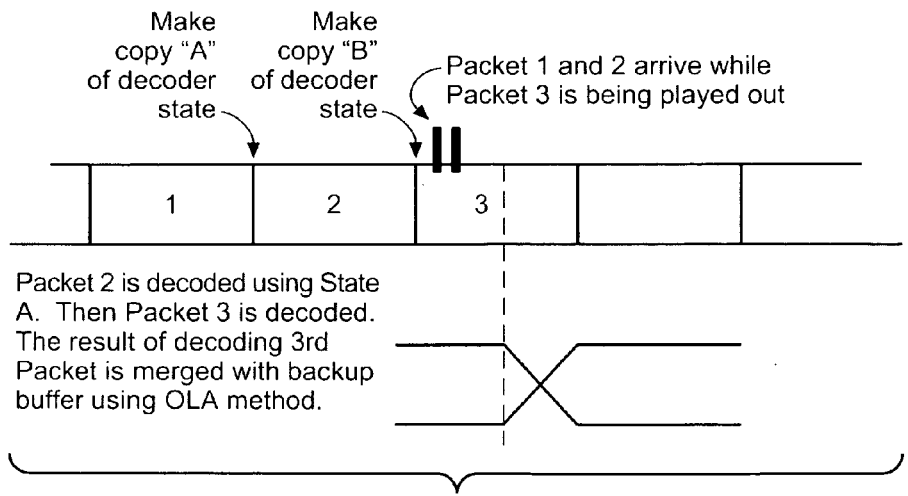
FIG. 5 is a diagram which is similar to FIG. 3, but which illustrates how the algorithm can be extended for larger packet delays.

Although an embodiment of the present invention may be configured to handle only the situation when the "late packet" still arrives while the filler waveform is being played out, it is easy to extend the idea over to situations when a packet is late by multiple frames. However, every time this technique is applied, the decoder has to be executed twice: once for the lost packet scenario, and the second time with the actual packet (that arrived late). Therefore, the computational and memory resources required are higher, and how much peak-load a system can take must be considered before choosing the number of consecutive late frames that can be handled. An example that illustrates late packet by two frames is shown in FIG. 5.

In a typical DSP based system implementation, the packets arriving from the network are placed into the jitter buffer by one process, which may be referred to as "process IN." To implement the present invention, execution of the code in the process IN may be modified to implement steps 2, 3, and 4, whenever a packet arrives late (and in the traditional scheme it would be dropped). Then, there is another process that is responsible for filling in the DMA buffer, which may be referred to as "process OUT". An embodiment of the present invention may provide that this process "wakes up" and begins execution periodically, and is responsible for checking the back-up buffer, and copying any samples in it to the DMA buffer. If the back-up buffer is empty, the process is responsible for picking up a packet from the jitter buffer, decoding it, and placing the result in the backup buffer with the appropriate overlap-and-add (step 1). Since both of the processes (IN and OUT) can access the back-up buffer, resource locking is preferably used such that only one of the processes modifies the back-up buffer at any given time.

While embodiments of the present invention are shown and described, it is envisioned that those skilled in the art may devise various modifications of the present invention without departing from the spirit and scope of the appended claims.

What is claimed is:

1. A method for improving voice quality in a voice-over-packet network, said network including a Direct Memory Access (DMA) buffer, a back-up buffer, and a jitter buffer, said method comprising: placing data in the jitter buffer, decoding at least some of the data in the jitter buffer thereby providing samples, placing some of the samples directly into the DMA buffer; placing the remaining samples directly into the back-up buffer; reading samples out of the DMA buffer; and, upon the DMA buffer getting empty, moving samples from the back-up buffer to the DMA buffer, and if the back-up buffer is empty, decoding data in the jitter buffer and placing some of the decoded data directly into the DMA buffer and the remaining decoded data directly into the back-up buffer.

2. A method as recited in claim 1, wherein a frame-size of the data is 80 samples, said method further comprising placing 20 samples in the DMA buffer and placing 60 samples in the back-up buffer.

3. A method as recited in claim 1, further comprising receiving a packet from the network, decoding the packet, and checking the back-up buffer to determine if there are any samples therein.

4. A method as recited in claim 3, further comprising if the jitter buffer contains any samples, merging the samples with decoded samples in the DMA buffer and back-up buffer.

5. A method as recited in claim 4, further comprising making a copy of a decoder state and generating speech samples for missing packets by running the decoder in packet-loss mode.

6. A method as recited in claim 5, further comprising when the packet arrives late, using the copy of the decoder state and decoding the packet.

7. A method as recited in claim 6, further comprising checking to determine if there is a request pending in the jitter buffer to increase a nominal delay and if there is a request pending, increasing the nominal delay by a pre-determined number of samples.

8. A method as recited in claim 7, further comprising merging samples in the DMA buffer with samples in the back-up buffer.

9. A method as recited in claim 8, further comprising continuing to use a same state of the decoder for subsequent frames which arrive.

10. An apparatus for improving voice quality in a voice-over-packet network, said apparatus comprising a Direct Memory Access (DMA) buffer, a back-up buffer, a decoder and a jitter buffer, said apparatus configured to place data in the jitter buffer, decode at least some of the data in the jitter buffer thereby providing samples, place some of the samples directly into the DMA buffer, place the remaining samples directly into the back-up buffer, read samples out of the DMA buffer, and, upon the DMA buffer getting empty, move samples from the back-up buffer to the DMA buffer, and if the back-up buffer is empty, decode data in the jitter buffer and place some of the decoded data directly into the DMA buffer and the remaining decoded data directly into the back-up buffer.

11. An apparatus as recited in claim 10, wherein a frame-size of the data is 80 samples, and wherein the apparatus is configured to place 20 samples in the DMA buffer and place 60 samples in the back-up buffer.

12. An apparatus as recited in claim 10, said apparatus configured to receive a packet from the network, decode the packet, and check the back-up buffer to determine if there are any samples therein.

13. An apparatus as recited in claim 10, said apparatus configured to, if the jitter buffer contains any samples, merge the samples with decoded samples in the DMA buffer and back-up buffer.

14. An apparatus as recited in claim 13, said apparatus configured to make a copy of a decoder state and generate speech samples for missing packets by running the decoder in packet-loss mode.

15. An apparatus as recited in claim 14, said apparatus configured to, when the packet arrives late, use the copy of the decoder state and decode the packet.

16. An apparatus as recited in claim 15, said apparatus configured to check to determine if there is a request pending in the jitter buffer to increase a nominal delay and if there is a request pending, increase the nominal delay by a pre-determined number of samples.

17. An apparatus as recited in claim 16, said apparatus configured to merge samples in the DMA buffer with samples in the back-up buffer.

18. An apparatus as recited in claim 17, said apparatus configured to continue to use a same state of the decoder for subsequent frames which arrive.

* * * * *